W. S. TEMPLE.
APPARATUS FOR MAKING WIRE GLASS.
APPLICATION FILED JULY 22, 1909.
959,434.
Patented May 24, 1910.
3 SHEETS—SHEET 2.
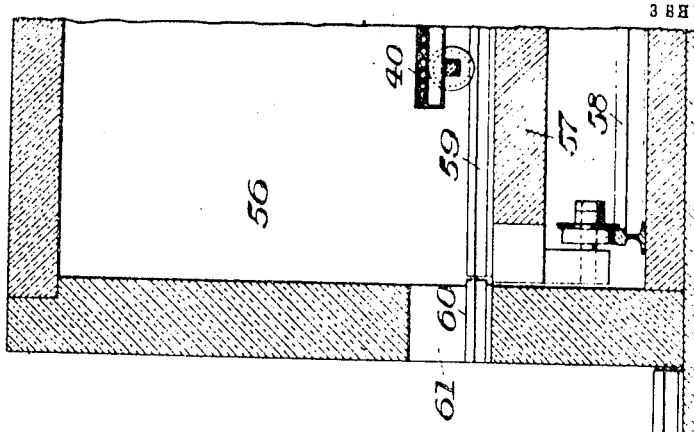
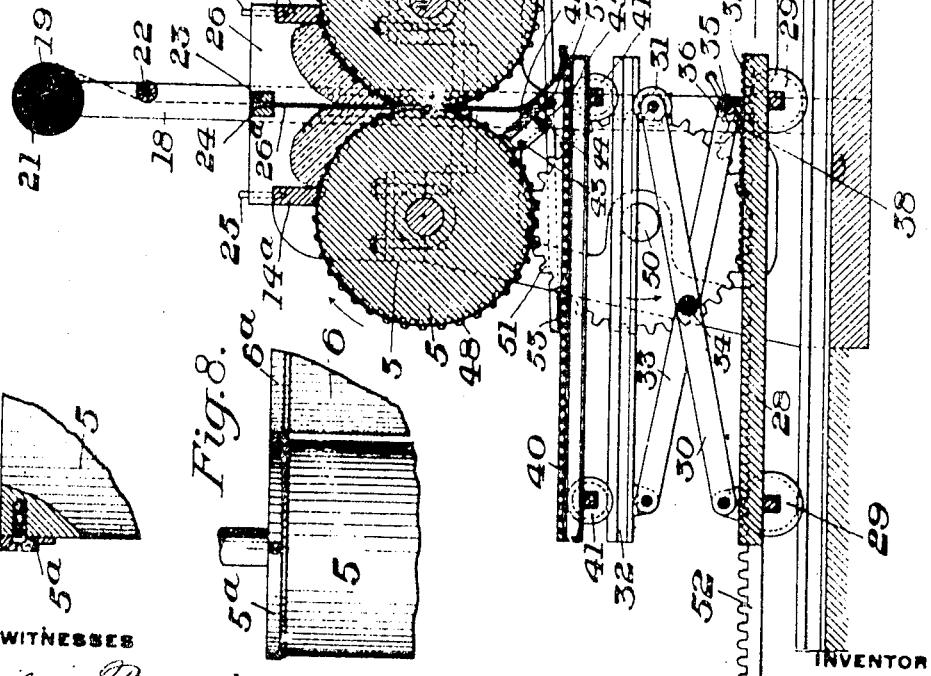
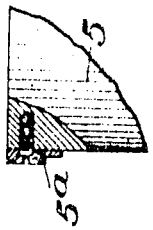

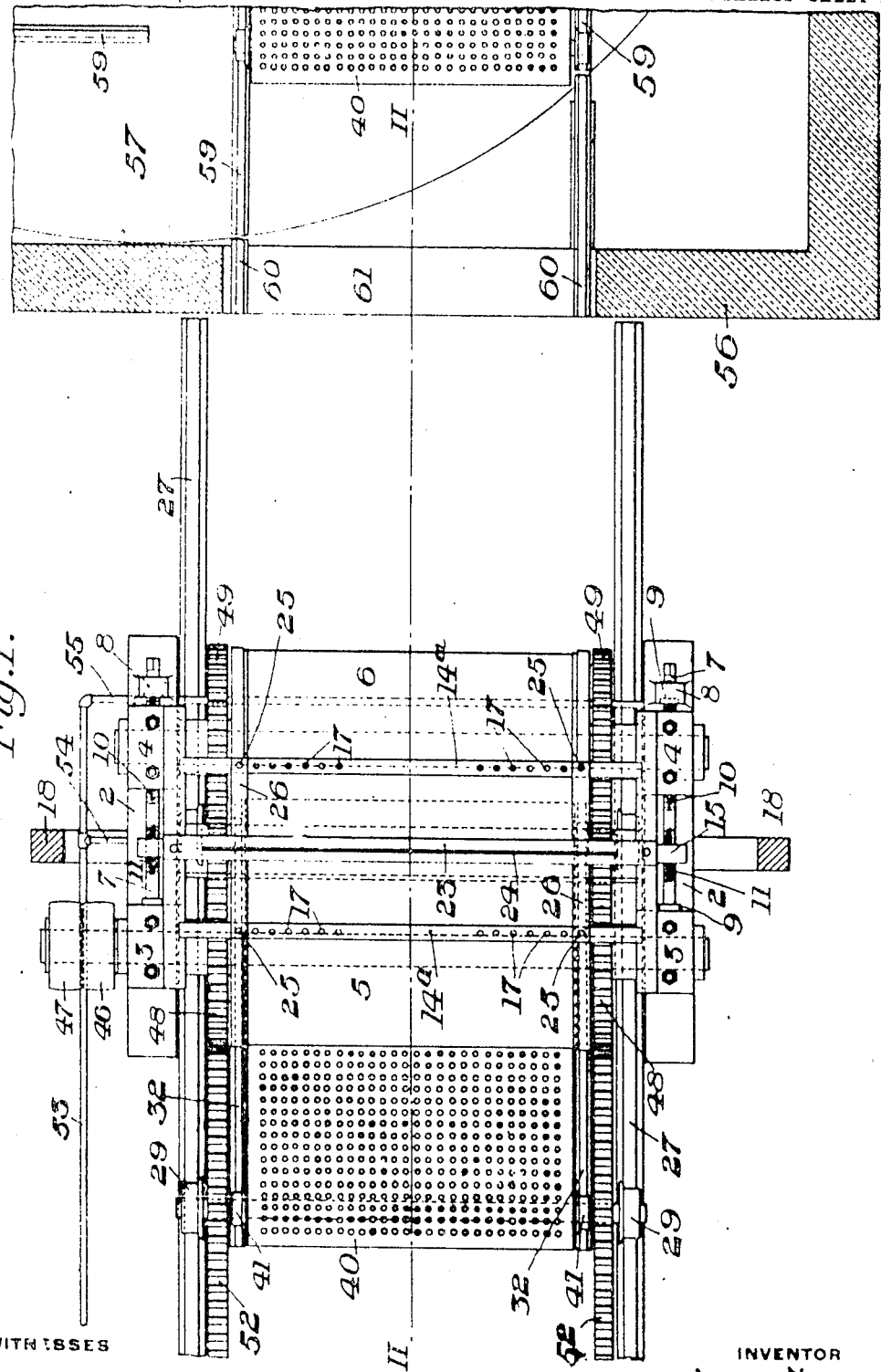

W. S. TEMPLE.
APPARATUS FOR MAKING WIRE GLASS.
APPLICATION FILED JULY 22, 1909.

959,434.

Patented May 24, 1910.
3 SHEETS—SHEET 3.

WITNESSES

INVENTOR
W. S. Temple,
by Bakewell, Byrnes & Parmelee,
his Attys

UNITED STATES PATENT OFFICE.

WILLIAM S. TEMPLE, OF NEW BETHLEHEM, PENNSYLVANIA, ASSIGNOR OF ONE-HALF TO THOMAS SPILLANE, OF NEW BETHLEHEM, PENNSYLVANIA.

APPARATUS FOR MAKING WIRE-GLASS.

959,434.

Specification of Letters Patent.  Patented May 24, 1910.

Application filed July 22, 1909. Serial No. 509,012.

*To all whom it may concern:*

Be it known that I, WILLIAM S. TEMPLE, of New Bethlehem, county of Clarion, and State of Pennsylvania, have invented a new and useful Improvement in Apparatus for Making Wire-Glass, of which the following is a full, clear, and exact description, reference being had to the accompanying drawings, in which—

Figure 1 is a plan view of one form of apparatus embodying my invention; Fig. 2 is a section on the line II—II of Fig. 1; Fig. 3 is a similar view on the line III—III of Fig. 2; Fig. 4 is a side elevation of the rolls and their bearings; Fig. 5 is a sectional view through the rolls showing the wire in position at the beginning of the formation of the sheet of glass; Fig. 6 is a side elevation of the clamp for centering the wire when starting to form a sheet of glass; Fig. 7 is a plan view of the same, and Figs. 8 and 9 are enlarged detail views of the forming rolls.

My invention has relation to apparatus for the manufacture of wire glass in which the wire is embedded in the central portion of the sheet of glass, and is designed to provide improved apparatus of this character in which the wire is guided between the two forming rolls.

Another object of my invention is to so construct the guides for the wire that they may be readily adjusted to take in various widths of wire, further in providing means whereby the rolls may be adjusted so as to form sheets of glass of various thickness.

Another object of my invention is to provide a table to receive the sheet of glass after it passes between the forming rolls which is moved transversely under said rolls at the same rate of speed as the speed of the forming rolls so as to receive the sheet of glass from the rolls without buckling or stretching the same.

Still another object of my invention is to provide a table which is mounted on a truck which is in turn mounted on rails, which is adjustable so that the height of the table may be varied.

The precise nature of my invention will be best understood by reference to the accompanying drawings which will now be described, it being premised, however, that various changes may be made in the details of construction, and general arrangement of the parts without departing from the spirit and scope of my invention, as defined in the appended claims.

In the drawings the numeral 2 designates the housings of the machine, and mounted in the bearings 3 and 4 which are supported on the housings 2 are the respective rolls 5 and 6. Secured to each end of each of these rolls 5 and 6 are the flanged collars 5ª and 6ª respectively. These collars are about one-half the thickness of the sheet of glass to be rolled, and the space between their flanges is about equal to the thickness of the wire cloth. The distance between flanges on each roll is equal to the width of glass to be rolled. The bearings 4 are mounted in guides on the housings and passing through the lower member of each of these bearings is a screw threaded rod 7. One end of this rod extends through a lug 8 projecting from the housings 2, and the other end extends into the bearing 3. Secured to this rod 7 near each of its ends and arranged to bear against the inner face of the lug 8 and the face of the bearing 3 are the collars 9, which collars prevent any longitudinal movement of the rod.

As can be seen by reference to Fig. 4, the portion of the rod 7 which extends through the bearing 4 is screw threaded as shown at 10; and it is also screw threaded at the central portion of the rod between the bearings 3 and 4 as indicated at 11. The latter screw threaded portion is composed of threads of one-half the pitch as the threads 10. Surrounding the screw threaded portion 10 and secured to the bearing 4 is the nut 12, and surrounding the screw threaded portion 11 is a nut 13.

Mounted above the rolls 5 and 6 is a frame 14 having downwardly projecting ends which rest on the bearings 3 and 4. Each end of this frame is provided with an arm 15, and the end of each of these arms is secured to the nut 13. By rotating the rod 7 the bearing 4 and the frame 14 will be either advanced toward or moved away from the roll 5, the roll 6 is moved twice the distance during each rotation of the rod as the movement given to the frame 14. This frame is also provided with longitudinal bars 14ª which extend along the top of the rolls 5 and 6 and are each provided with a series of orifices 17 for the purpose hereinafter described.

Projecting upwardly along the outside of the housings 2 are the uprights 18, and mounted in suitable bearings in the upper end of these uprights is a rod 19, provided with collars 20, between which is secured a roll of wire mesh 21. Journaled in these uprights and slightly below the rod 19 is an idle roller 22. Secured to the upper portion of the ends of the frame 14 and at the center thereof is the bar 23, having a slot 24 through the center thereof through which the wire cloth 21 passes. Mounted on this frame 14 and held in position on the bars 14ᵃ by means of the pegs 25 are the members 26. These members 26 together with longitudinal members 14ᵃ and the rolls 5 and 6 form a hopper to receive molten glass.

26ᵃ are vertical slots in the members 26 in line with the slot 24, which form guides for the edges of the wire cloth.

Below the rolls 5 and 6 are the rails 27 which may be secured to stringers or ties embedded in the floor or ground. Mounted on these rails is a truck 28 having wheels 29 which roll on the track 27. Pivotally connected to one end of this truck are the parallel arms 30. The other end of each of these arms is provided with a roller 31 and each of these rollers bears against the bottom of rail 32. Pivotally connected to the other end of each of these rails and above the pivotal points of the levers 30 are the parallel levers 33. The levers 30 on each side of the truck are pivoted to each other as indicated at 34. Passing loosely through the other end of these levers 33 is the shaft 35, and secured to each end of this shaft is a pinion 36 which meshes with the teeth of a rack 37 secured to the top of the truck 28. Pivotally connected to each end of this shaft 35 is a dog 38 which dogs are normally in engagement with the teeth of the racks 37.

40 is a table for receiving the sheet of glass, which table is provided with the wheels 41 which rest on the rails 32.

Secured below the rollers 5 and 6 and between the housings of the machine is an adjustable guide 42 which is pivoted to the housings at 43 and is provided with slots 44 to receive bolts 45 to clamp the guide in its adjusted position.

Secured to the shaft of the roller 5 are the loose and tight pulleys 46 and 47, and secured to the shaft of the roller 5 are the spur gears 48 which mesh with the spur gears 49 on the shaft of the roller 6.

Journaled on a stud 50 on each of the housings of the machine is a gear wheel 51 which meshes with one of the gear wheels 48, and secured on each side of the truck 28 is a rack 52 each of which is engaged by the teeth of one of the gear wheels 51.

53 is a gas supply pipe which is provided with the burner pipes 54 and 55, the pipe 54 being adjacent to the guide 42 the flame of which strikes the lower side of the sheet of glass while the pipe 55 lies above the sheet of glass when it is moved along as hereinafter described.

56 is an annealing furnace which may be of any well known construction. In this case I have shown it as being provided with a turn-table 57 mounted on the circular track 58. This turn-table is provided with a series of tangentially disposed tracks 59, one set of which is always in alinement with the short rails 60, extending through the opening 61 of the furnace. These rails 60 are also in alinement with the adjustable rails 32, and when the sheet of glass has been placed upon the table 40, the table and the sheet of glass can be transferred from the rails 32 to the turn-table 57 in the furnace in the manner hereinafter described.

In Figs. 6 and 7, I have shown one form of clamp which is used to clamp the end of the wire and center the same between the forming rolls 5 and 6 when starting to roll a sheet of glass. This clamp comprises the flat parallel members 62. The ends of one of these members is provided with the pivoted bolts 63 which work in a slot in the ends of both of the members 62. The outer end of each of these bolts is provided with a thumb-screw 64 which bears against a spring 65, which in turn bears against a washer 66 in engagement with the other member 62.

The operation is as follows: The rolls are first provided with collars 5ᵃ and 6ᵃ respectively, of the proper width and thickness and they are then adjusted so that the proper thickness of glass will be rolled, the end members 26 of the hopper are then placed in their proper position to guide the edges of the wire cloth. As above stated, the adjusting of the roll will move the frame 14 so that the center thereof is directly above the center between the two rolls. The wire is then passed between the rolls and the end is clamped between the clamping members 62, the wire cloth is then rolled backward so that the clamping members will be drawn between the two rolls as shown in Fig. 5, and thereby center the wire cloth between the rolls. The table is now adjusted to its proper height by raising the dogs 38 and rotating the shaft 35 which will elevate or lower the rails 32 to the desired point, after which the dogs 38 are dropped so as to engage the racks 37 and retain the table in its adjusted position. Glass is now poured into the hopper and the belt is thrown from the loose to the tight pulley to rotate the rolls. This rotation of the rolls will also move the truck 28 and with it the table 40 in the direction of the arrow on Fig. 2. After all of the glass which has been thrown into the hopper has passed between the rolls, the cloth is sheared and the truck is moved toward the furnace and the table shifted from the track 32 to the turntable 57 in the furnace. The glass in passing downward from the rolls to the table strikes the guide 42 and is deflected to the table and while passing from the guide to the table a flame from the burner 54 strikes the bottom of the sheet of glass to finish this side and while the sheet is passing under the burner 55 the top thereof is finished. After this table has been moved from the platform 32 into the furnace, the truck is moved backward to a point slightly to the rear of that shown in Fig. 2 and another table is placed on this platform and the operation is repeated to form the next sheet of glass.

The advantages of my invention result from the provision of means whereby the thickness as well as the width of the sheet of glass can readily be varied. Further in providing means whereby the table is moved transversely under the forming roll at the same speed as the speed of the glass passing between the forming rolls. Further in providing an adjustable guide below the rollers to deflect the sheet of glass to the table. Also in the provision of adjustable means for varying the height of the table to meet the requirements of various conditions which may be caused by the thickness of the glass, as well as to line up the table supporting rails with the rails extending through the opening in the furnace.

I claim:

1. Apparatus for the manufacture of wire glass, a movable table, a pair of forming rolls, means on the rolls for engaging both sides of the wire cloth to feed it forwardly, means to feed molten glass on each side of the wire cloth between the rolls, and means for rotating the rolls and moving the table at the same speed; substantially as described.

2. Apparatus for the manufacture of wire glass, a movable table, a pair of forming rolls, means on the rolls for engaging both sides of the wire cloth to feed it forwardly, means to feed molten glass on each side of the wire cloth between the rolls, and gearing for rotating the rolls and moving the table at the same rate of speed; substantially as described.

3. Apparatus for the manufacture of wire glass, a movable table, means to adjust said table vertically, means on the rolls for engaging both sides of the wire cloth to feed it forwardly, means to feed molten glass on each side of the wire cloth between the rolls, and means for rotating the rolls; substantially as described.

4. Apparatus for the manufacture of wire glass, a longitudinally movable platform, a longitudinally movable table mounted on the platform, a pair of forming rolls, means to adjust the platform vertically to adjust the height of the table with relation to the rolls, means for rotating the rolls and moving the table at the same rate of speed, and means for feeding wire cloth and molten glass between the rolls; substantially as described.

5. Apparatus for the manufacture of wire glass having a table mounted on a track, an adjustable platform for supporting said track, a second track for supporting said adjustable table, a pair of forming rolls, means for feeding wire cloth and glass between the rolls, and means for rotating the rolls and moving the platform at the same rate of speed; substantially as described.

6. Apparatus for the manufacture of wire glass, a table movably mounted on a track, toggle levers connected to said track and to a movable truck, and means to adjust said toggle levers to raise and lower the track; substantially as described.

7. Apparatus for the manufacture of wire glass, a table to receive a sheet of glass, a pair of forming rolls, a hopper above said rolls, guides in said hopper to receive wire cloth, and means to adjust the rolls and guides simultaneously; substantially as described.

8. Apparatus for the manufacture of wire glass, a table to receive a sheet of glass, a pair of forming rolls, a hopper above said rolls, means to adjust the ends of the hopper to lengthen or shorten said hopper, guides in said hopper to receive wire cloth, and means to adjust the rolls simultaneously; substantially as described.

9. Apparatus for the manufacture of wire glass, a table movably mounted on a track, toggle levers connected to said track and to a movable truck, and rack and pinion connections to adjust said toggle levers to raise and lower the track; substantially as described.

10. Apparatus for the manufacture of wire glass, a movable table, a pair of forming rolls, a hopper above the forming rolls and arranged to receive molten glass, and removable collars on the ends of both of the rolls arranged to form edge stops for the sheet of glass, and to engage and feed the wire cloth; substantially as described.

11. Apparatus for the manufacture of wire glass, a movable table, a pair of forming rolls, a hopper above the forming rolls and arranged to receive molten glass, and removable collars on the ends of both of the rolls arranged to form flanged edge stops for the sheet of glass and to engage and feed the wire cloth; substantially as described.

12. Apparatus for the manufacture of wire glass, a pair of forming rolls, a hopper above the rolls arranged to receive molten glass, means to guide wire cloth centrally within said hopper, and removable edge stops on the ends of both rolls arranged to form edge stops for the sheet of glass and to engage and feed the wire cloth centrally between the two rolls; substantially as described.

13. Apparatus for the manufacture of wire glass, a pair of forming rolls, a hopper above the rolls arranged to receive molten glass, means to guide the wire cloth centrally within said hopper, and removable flanged edge stops for the sheet of glass arranged to engage and feed the wire cloth centrally between the rolls; substantially as described.

14. Apparatus for the manufacture of wire glass, a pair of forming rolls, edge stops on the rolls for the sheet of glass, a hopper above the rolls arranged to receive the molten glass, means on the hopper to guide the wire cloth centrally between the rolls and the edge stops, a table located below the rolls arranged to receive the sheet of glass, and means to move said table longitudinally under the rolls; substantially as described.

In testimony whereof, I have hereunto set my hand.

WILLIAM S. TEMPLE.

Witnesses:
 DANIEL M. GEIST,
 TILLIE KRUMP.